United States Patent
Cayer

(10) Patent No.: US 12,401,628 B2
(45) Date of Patent: Aug. 26, 2025

(54) AUTOMATIC SAE ID EXCHANGE FOR QUANTUM KEY DISTRIBUTION (QKD) CRYPTOGRAPHY

(71) Applicant: Ciena Corporation, Hanover, MD (US)

(72) Inventor: Yves Cayer, Ottawa (CA)

(73) Assignee: Ciena Corporation, Hanover, MD (US)

( * ) Notice: Subject to any disclaimer, the term of this patent is extended or adjusted under 35 U.S.C. 154(b) by 198 days.

(21) Appl. No.: 18/353,244

(22) Filed: Jul. 17, 2023

(65) Prior Publication Data

US 2025/0030667 A1    Jan. 23, 2025

(51) Int. Cl.
*H04L 9/40* (2022.01)
*H04L 9/08* (2006.01)
*H04L 9/32* (2006.01)

(52) U.S. Cl.
CPC ........ *H04L 63/0428* (2013.01); *H04L 9/0819* (2013.01); *H04L 9/0852* (2013.01); *H04L 9/321* (2013.01); *H04L 63/166* (2013.01)

(58) Field of Classification Search
CPC .................................................. H04L 63/0428
See application file for complete search history.

(56) References Cited

U.S. PATENT DOCUMENTS

| | | | | |
|---|---|---|---|---|
| 2017/0012941 | A1* | 1/2017 | Subbarayan | ............ H04L 41/28 |
| 2022/0272084 | A1* | 8/2022 | Hyatt | .................... H04W 12/40 |
| 2024/0380587 | A1* | 11/2024 | Grammel | ............. H04L 9/0855 |

OTHER PUBLICATIONS

Riccardo Bassi et al., "Quantum Key Distribution with Trusted Relay using an ETSI-compliant Software-Defined Controller," 19th International Conference on the Design of Reliable Communication Networks, IEEE, Apr. 13, 2023, 7 pp.
Bernardo A. Hubermann et al., "Quantum Secured Internet Transport," Information Systems Frontiers, vol. 22, No. 6, Nov. 3, 2020, pp. 1561-1567.
Sep. 17, 2024, International Search Report and Written Opinion for International Patent Application No. PCT/US2024/037566.
"Quantum Bridge's Key Management Entity (KME)", https://qubridge.io/wp-content/uploads/2022/12/Quantum-Bridge-KME-2.pdf, Dec. 2022, 2 pages.
"Quantum security technologies", https://www.ncsc.gov.uk/whitepaper/quantum-security-technologies, Mar. 24, 2020, 4 pages.

(Continued)

*Primary Examiner* — Simon P Kanaan
(74) *Attorney, Agent, or Firm* — Baratta Law PLLC; Lawrence A. Baratta, Jr.

(57) ABSTRACT

This disclosure provides systems, methods, and apparatuses for network devices of a transport network to obtain quantum key distribution (QKD) keys from a QKD system. The disclosed techniques enable network devices to exchange secure application entity identifications (SAE IDs) via a trusted channel between each pair of network devices. A trusted channel is a channel where the endpoints are known, and data integrity is protected in transit. Depending on the communications protocol used, a trusted channel is a communication channel in which the network devices have authenticated each other or in which the channel data privacy is protected in transit. A pair of network devices can exchange SAE IDs via a trusted channel so that each network device in the pair can obtain corresponding key material from the QKD system.

20 Claims, 8 Drawing Sheets

(56) References Cited

OTHER PUBLICATIONS

Cho, et al., "Using QKD in MACsec for secure Ethernet networks", 2021 The Authors. IET Quantum Communication published by John Wiley & Sons Ltd on behalf of the Institution of Engineering and Technology. IET Quant. Comm. 2021;2:66-73. wileyonlinelibrary.com/journal/qtc2, Feb. 5, 2021, pp. 66-73.

Elboukhari, et al., "Improving TLS Security by Quantum Cryptography", International Journal of Network Security & Its Applications (IJNSA), vol. 2, No. 3, Jul. 2010, Jul. 2010, pp. 87-100.

Huberman, et al., "Quantum Secured Internet Transport", arXiv:2007.05522 [cs.CR] https://doi.org/10.48550/arXiv.2007.05522, Jul. 10, 2020, 9 pages.

Mink, et al., "Quantum Key Distribution (QKD) and Commodity Security Protocols: Introduction and Integration", International Journal of Network Security & Its Applications (IJNSA), vol. 1, No. 2, Jul. 2009, Jul. 2009, pp. 101-112.

Stebila, et al., "The Case for Quantum Key Distribution", Workshop on Quantum and Classical Information Security, LNICST, Springer, 2009, to appear. Eprint arXiv:0902.2839, http://eprint.iacr.org/2009/082., Nov. 2, 2009, 12 pages.

\* cited by examiner

AUTOMATIC SAE ID EXCHANGE FOR QUANTUM KEY DISTRIBUTION (QKD) CRYPTOGRAPHY

TECHNICAL FIELD

This disclosure relates generally to networking and some aspects relate to an SAE ID exchange between two or more network devices of a transport network via a trusted channel.

DESCRIPTION OF RELATED TECHNOLOGY

A transport network (such as an optical transport network (OTN)) is composed of a set of network devices and a set of links that connect one network device to another to exchange data. The links might include cables or wireless signals (including links that traverse public networks, shared networks, wireless networks, or point-to-point network connections) that connect the network devices with one another. The network devices can implement security protocols to protect data communicated via a link.

Data path encryption (DPE) refers to encryption of data communicated via a traffic channel (sometimes also referred to as an encrypted traffic channel or DPE channel) between two network devices. The network devices can implement various cryptographic techniques for DPE. In some implementations, the endpoints of the encrypted traffic channel are modems of the network devices, where the modems connect to the link between the network devices. The modems use encryption keys to encrypt and decrypt data communicated via the encrypted traffic channel.

To improve security of an encrypted traffic channel, a transport network can obtain encryption keys for DPE from a quantum key distribution (QKD) system. The QKD system uses properties of quantum physics to coordinate encryption keys (sometimes referred to as QKD keys or key material) and distribute the encryption keys to two network devices that terminate an encrypted traffic channel. If a third-party attempts to eavesdrop on the QKD quantum channel, the keys become compromised and are not delivered to the transport network for DPE.

In a QKD system, Secure Application Entities (SAEs) are the consumers of key material; the key material is managed by a QKD network. The SAEs use the key material to encrypt data from one SAE to another SAE. Each SAE has a unique ID (SAE ID). The key material (sometimes also referred to as a QKD cryptography key) is specific to a pair of SAEs. Some QKD systems implement a technical specification, such as European Telecommunications Standards Institute (ETSI) group specification (GS) for QKD. The ETSI GS QKD 014 specification provides a protocol and data format for representational state transfer (REST)-based key delivery using an application programming interface (API). The ETSI GS QKD 014 specification refers to a master SAE as the entity making an initial key request for key material and a slave SAE as the entity requesting the matching key material. A master SAE making an initial request for key material from the QKD system includes the SAE ID of the intended slave SAE, and a slave SAE making a subsequent request for the matching key material includes the SAE ID of the master SAE that initiated the initial request.

BRIEF SUMMARY

The systems, methods, and apparatuses of this disclosure each have several innovative aspects, no single one of which is solely responsible for the desirable attributes disclosed herein.

One aspect of this disclosure can be implemented as a network device, the network device including a first encryption modem configured to: establish a trusted channel with a second encryption modem of a second network device, send a client message to the second encryption modem via the trusted channel, the client message indicating a first secure application entity identifier (SAE ID) associated with the first network device, and receive a server message from the second encryption modem via the trusted channel, the server message indicating a second SAE ID associated with the second network device; and a control processor (CP) communicatively coupled to the first encryption modem, the CP configured to request Quantum Key Distribution (QKD) cryptographic key for use with the second network device from a Key Management Entity (KME) based on the second SAE ID.

Another aspect of this disclosure can be implemented as a method of retrieving QKD cryptographic keys in a system having a plurality of network devices, including a first and a second network device, each network device including a first encryption modem and having a SAE ID, each network device connected to a KME, the KMEs linked in a QKD network, the method including establishing, at the first network device, a first trusted channel between the first encryption modem of the first network device and the first encryption modem of the second network device; sending, on the first trusted channel, a client message from the first encryption modem of the first network device to the first encryption modem of the second network device, the client message including the SAE ID of the first network device; receiving, via the first trusted channel, a server hello message from the first encryption modem of the second network device at the first encryption modem of the first network device, the server hello message including the SAE ID of the second network device; and retrieving, from the KME connected to the first network device, based on the SAE ID of the second network device, the QKD cryptographic key for use with the second network device. Another aspect of this disclosure can be implemented as a first network device including a control processor (CP); and a first encryption modem communicatively coupled to the CP, the first encryption modem configured to: establish a first trusted channel between the first encryption modem of the first network device and the first encryption modem of a second network device; receive a client message from the first encryption modem of the second network device via the first trusted channel, the client message indicating a second secure application entity identifier (SAE ID) associated with the second network device; forward the second SAE ID to the CP; send a server message to the first encryption modem of the second network device via the first trusted channel, the server message indicating a first SAE ID associated with the first network device; and receive data from the first encryption modem of the second network device, the data encrypted with a Quantum Key Distribution (QKD) cryptographic key for use with the first network device, the QKD cryptographic key associated with the first SAE ID.

Details of one or more implementations of the subject matter described in this disclosure are set forth in the accompanying drawings and the description below. Other features, aspects, and advantages will become apparent from the description, the drawings, and the claims.

BRIEF DESCRIPTION OF THE SEVERAL VIEWS OF THE DRAWINGS

Like reference numbers and designations in the various drawings indicate like elements. Note that the relative dimensions of the figures may not be drawn to scale.

DETAILED DESCRIPTION

Figure 1A:
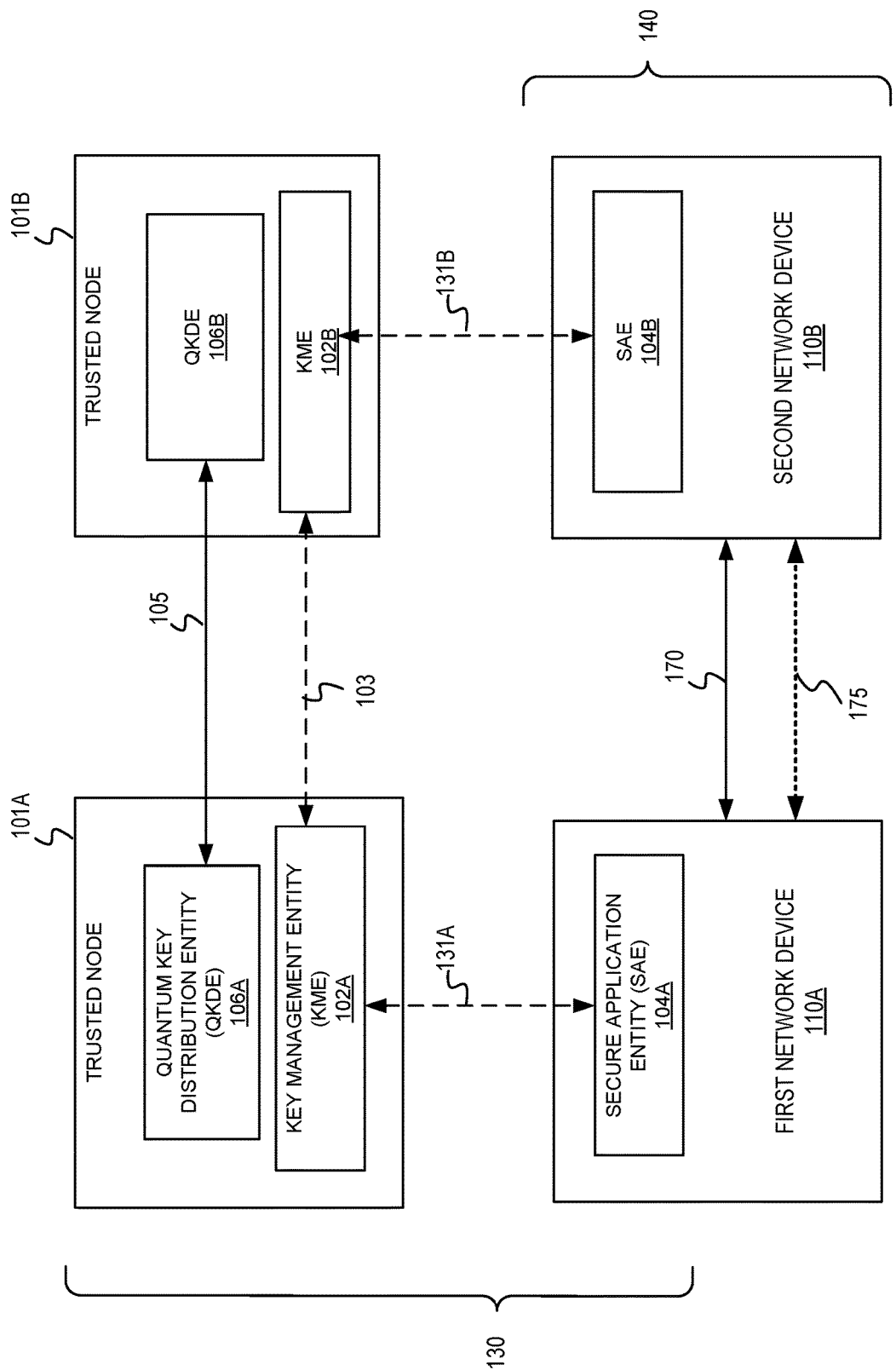
FIG. 1A illustrates an example quantum key distribution (QKD) system used with a transport network.

The following description is directed to certain implementations for the purpose of describing innovative aspects of this disclosure. However, a person having ordinary skill in the art will readily recognize that the teachings herein can be applied in a multitude of different ways. The described implementations can be implemented in any means, apparatus, system, or method for network communication.

Quantum Key Distribution (QKD) cryptography refers to encryption that uses the key material (such as QKD keys) obtained from a QKD system. In a QKD system, Secure Application Entities (SAEs) are the consumers of the key material; a QKD network distributes the key material to the SAEs; and the SAEs use the key material to encrypt the data transferred between the SAEs. Each SAE has a unique ID (SAE ID) and obtains matching key material from the QKD system by communicating the target SAE ID of another SAE in a pair of SAEs. A transport network that uses QKD cryptography might implement an SAE at each network device and use the key material for data path encryption between the network devices. Each network device includes at least one encryption modem; each encryption modem is considered an independent encryptor and decryptor of an encrypted traffic channel. In some implementations, each network device might have a single SAE ID that can be used to obtain key material from the QKD system for multiple encryption modems in the network device. In some deployments, a network device can have multiple encryption modems that terminate corresponding encrypted traffic channels with different remote network devices. Absent the techniques of this disclosure, manual provisioning of SAE IDs for each connected encryption modem and their corresponding network devices can be cumbersome and prone to error.

This disclosure provides systems, methods, and apparatuses for network devices of a transport network to obtain QKD keys from a QKD system. The disclosed techniques enable network devices to exchange SAE IDs via a trusted channel between each pair of network devices. In some aspects, a first encryption modem of the first network device is connected by a communications link to a second encryption modem of a second network device. A control processor of the first network device establishes a trusted channel between the first encryption modem and the second encryption modem over the communications link. A trusted channel is a channel where the endpoints are known, and data integrity is protected in transit. Depending on the communications protocol used, a trusted channel is a communication channel in which the network devices have authenticated each other or in which the channel data privacy is protected in transit. Examples include transport layer security (TLS), IP security (IPsec), and secure physical connections. In some aspects, the trusted channel is secured by a Transport Layer Security (TLS) authenticated session.

The encryption modems exchange SAE IDs via the trusted channel. The network devices (such as their respective control processors) can use the SAE IDs to obtain key material from the QKD system. The network devices (such as their respective encryption modems) use the key material for data path encryption of an encrypted traffic channel between the encryption modems.

Particular aspects of the subject matter described in this disclosure realize one or more of the following potential advantages. SAE IDs can be automatically exchanged between endpoint network devices via trusted channels between two or more network devices, thereby reducing user complexity. QKD encryption can be deployed quickly and with greater accuracy by leveraging an SAE ID exchange protocol between network devices. Some aspects enable a first network device to obtain and coordinate SAE IDs for multiple remote network devices that terminate respective encrypted traffic channels of the first network device. The integration of QKD encryption in a transport network enables the transport network leverage key material from a QKD system for datapath encryption without the complexity of establishing a direct quantum channel between the network devices of the transport network.

FIG. 1A illustrates an example quantum key distribution (QKD) system 130 used with a transport network 140. The example QKD system 130 implements the European Telecommunications Standards Institute (ETSI) group specification (GS) for QKD specifications. The QKD system 130 includes trusted nodes 101A and 101B (collectively referred to as trusted nodes 101), which are securely operated and managed at different sites. Each trusted node 101 includes at least one key management entity (KME) and at least one quantum key distribution entity (QKDE). For example, trusted node 101A includes QKDE 106A and KME 102A; trusted node 101B includes QKDE 106B and KME 102B. A QKD link 105 connects the QKDEs 106A and 106B. The trusted nodes 101 might have more than one QKDE (not shown) with QKD links to the KMEs of other trusted nodes. Each QKD link connects a pair of QKDEs via a quantum channel. The KMEs 102A and 102B manage keys in the QKD system 130 and communicate via the QKDEs and QKD links. Each KME is able to distribute keys (shown at arrow 103) to other KMEs via the QKD links.

SAEs are located and connected to KMEs at each site. For example, SAE 104A is located at the same site as trusted node 101A and obtains key material for QKD cryptography from the KME 102A over a trusted channel achieved via, at a minimum, a secure physical connection; SAE 104B obtains key material from KME 102B in the same way. The ETSI GS QKD 014 specification provides a REST (REpresentational State Transfer) API (shown as communications 131A and 131B) for the delivery of key material from KMEs to SAEs. The REST API specifies the format of the Uniform Resource Identifiers (URIs), the communication protocols (HTTPS), and the JSON (JavaScript Object Notation) data format encoding of posted parameters and responses, including key material. The ETSI GS QKD 014 specification enables a first SAE (referred to as a master SAE) to make an initial key request to a local KME for key material. The first SAE indicates the SAE ID of a second SAE (referred to as a slave SAE) when making an initial key request for key material. The second SAE includes the SAE ID of the first SAE in a subsequent key request to its local KME to obtain matching key material. Each SAE may take on the role of either master SAE or slave SAE in the context of a QKD system that conforms to the ETSI GS QKD 014 specification.

FIG. 1A also shows a transport network 140 that uses key material from the QKD system 130 for data path encryption. The transport network 140 includes a first network device 110A and a second network device 110B. In some implementations, transport network 140 is an optical transport network and the network devices are connected by a fiber optic link. To integrate QKD cryptography, the first network device 110A can serve as the SAE 104A of the QKD system 130 and the second network device 110A can serve as the SAE 104B. The SAEs 104A and 104B can obtain matching key material from their respective KMEs 102A and 102B and provide the key material to encryption modems (not shown) of each network device 110A and 110B. The encryption modems terminate an encrypted traffic channel between the network devices 110A and 110B over link 175; in some example approaches link 175 is an optical link connecting the encryption modems. The encryption modems can encrypt and decrypt data using the QKD key material, sometimes in combination with other cryptographic keys established at the network devices.

In one example approach, the SAE IDs associated with network devices of a transport network are manually provisioned. Although FIG. 1A shows two network devices, transport networks can vary between simple deployments, where two network devices are interconnected with encryption modems, and complex deployments where a single network device may terminate encrypted traffic channels for several remote network devices. In one example approach, each network device is an SAE of a QKD system. In another example approach, each network device can have one or more encryption modems for terminating encrypted traffic channels to other network devices; in some such example approaches, each encryption modem is an SAE of a QKD system. In other such example approaches, each encryption modem in a network device shares the same SAE ID.

To implement QKD cryptography between an encryption modem of the first network device and an encryption modem of a second network device, the first and second network devices need to obtain each other's SAE ID. As the transport network becomes more complex and the number of network devices increases, it can become more difficult to manually provision and share the SAE IDs across the different network devices and for various encrypted traffic channels. A trusted channel 170 can be used, however, to securely exchange SAE IDs between SAEs. In one such example approach, the trusted channel 170 is implemented on link 175.

Figure 1B:
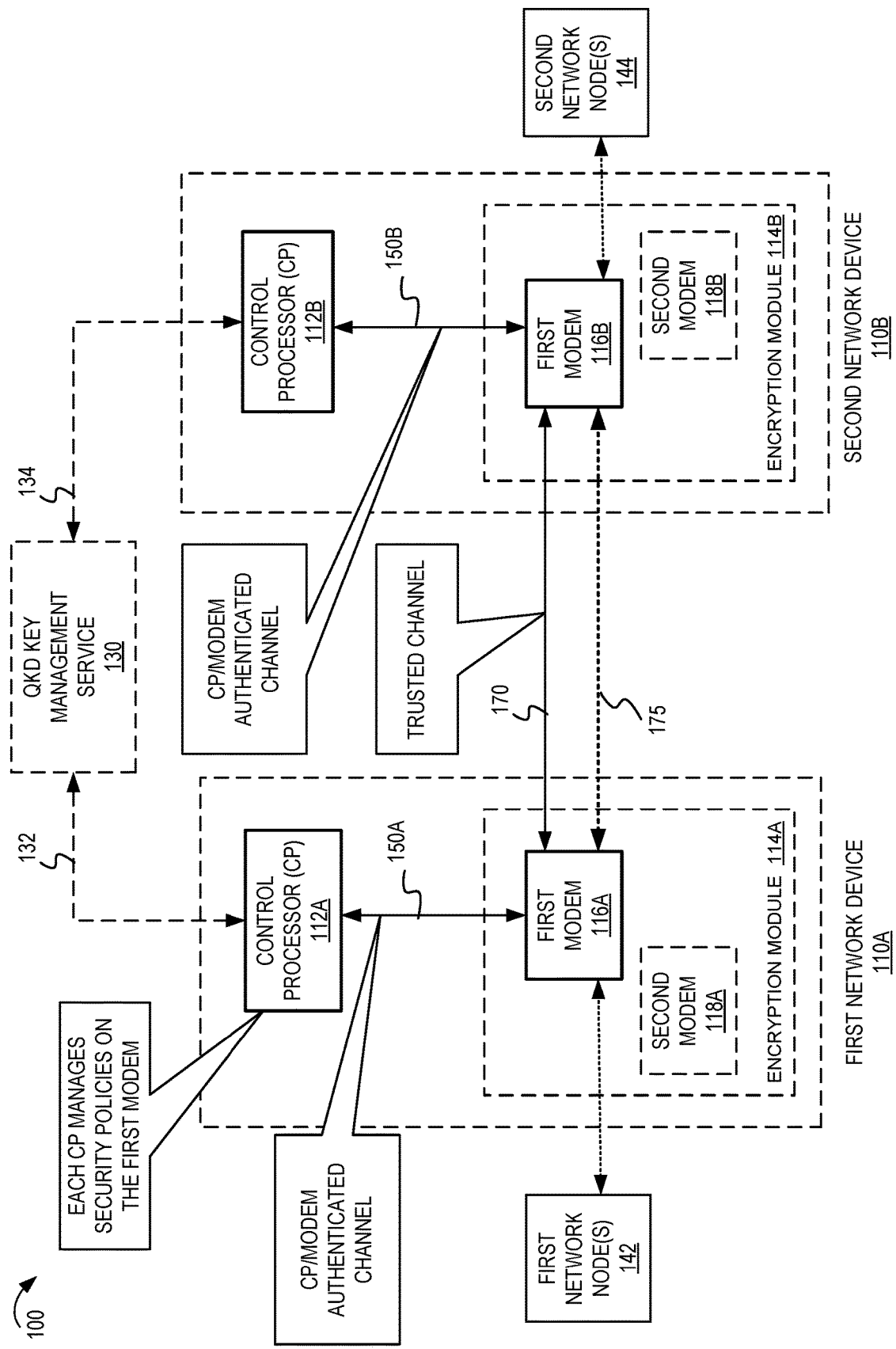
FIG. 1B illustrates an example transport network that uses QKD encryption.

FIG. 1B illustrates an example transport network 100 that uses key material from the QKD system 130 for encryption. The example transport network 100 includes a first network device 110A and a second network device 110B (collectively, network devices 110). The network devices 110 are connected via a link 175 running between an encryption modem 116A in an encryption module 114A on the first network device 110A and a first encryption modem 116B in a second encryption module 114B on the second network device 110B. In one example approach, link 175 includes a fiber optic cable connecting the encryption modems 116. In one example approach, each encryption modem 116 is connected via authenticated channel 150 to a control processor 112. The control processor in each network device 110 manages security policies on the encryption modem(s) of each respective network device 110.

In one example approach, the first encryption modem 116A of the first network device 110A is connected to first network node(s) 142 while the first encryption modem 116B of the second network device 110B is connected to second network node(s) 144.

In the example approach shown in FIG. 1B, network device 110A includes a control processor 112 and an encryption modem 116 connected via an authenticated channel to control processor 112. The encryption modem is associated with a first secure application entity identifier (SAE ID). When connected to a first encryption modem 116 at a remote network device 110B having a second SAE ID, the encryption modem 116 of network device 110A establishes a trusted channel 170 with the encryption modem 116 of the remote network device 110B, sends a client hello message to the encryption modem 116 of the remote network device 110B over the trusted channel 170, the client hello message including the first SAE ID, and receives a server hello message from the encryption modem 116 on the remote network device 110B over the trusted channel 170, the server hello message including the second SAE ID. Although the technique for exchanging SAE IDs is described here through the use of a client hello message and a server hello message, other messages could be used as well to accomplish the exchange.

In one example approach, the control processor 112 of first network device 110A retrieves key material for the remote network device 110B from a QKD key management system 130 over a link 132. The key material can be referred to as a QKD cryptographic key. The QKD cryptographic key is said to be based on the second SAE ID because the QKD cryptographic key is specific to a relationship between the first SAE and the second SAE. Similarly, the control processor 112 of second network device 110B retrieves a QKD cryptographic key for the remote network device 110A from a QKD key management system 130 over a link 134. The QKD cryptographic key is based on the first SAE ID. A QKD encrypted traffic channel is implemented on link 175 via the two QKD cryptographic keys.

In one example approach, control processor 112 loads datapath encryption authentication material to its respective first encryption modem 116. When establishing a trusted channel, the encryption modem 116 associated with the first SAE ID establishes a Transport Layer Security (TLS) session with the remote network device 110B using the datapath encryption authentication material loaded by its respective control processor 112. In one such example approach, the datapath encryption authentication material for the encryption modem includes one or more certificates (such as an X.509 certificate), a key agreement, a key exchange, or a pre-shared key (PSK).

In one example approach, each encryption modem in network device 110 is forced into a non-operational state where the link 175 is not transmitting or receiving encrypted traffic. That is, the module has no bypass functionality and is not able to pass clear text traffic. Authentication between the control processor 112 and each encryption modem 116 is performed to bring up the north/south channel (authenticated channel 150). In one such example approach, the control processor 112 establishes a TLS 1.3 session with each first encryption modem 116 and each second encryption modem 118, a two-step process where an initial authentication is performed using default material (such as initial device ID), followed by a second step when runtime authentication material is used and subsequently latched. This is a trust on first use scheme. The control processor 112 may then manage and provision each encryption modem 116, 118 directly.

Once provisioned with the authentication material from the control processor 112, the encryption modem 116 waits for detection that link 175 (such as an optical fiber link) is connected to encryption modem 116 at the second network device 110B and that the overhead communications channel is up. The local and remote modems then establish a TLS 1.3 connection, where peer authentication occurs using, for instance, PSK or a provided X.509 certificate.

In one example approach, Control Processor 112 manages its respective network device 110 and up to four encryption modules 114, each encryption module 114 including a first encryption modem 116 and an encryption modem 118. In one such example approach, control processor 112 provides the external management interfaces and is the single point of entry for the user. It also serves as the central storage facility for any encrypted key material exported from the encryption module 114. Management functions include configuration, alarm monitoring, log collection, the cryptographic functions performed by the control processor include operations related to the provisioning of the chassis (access controls, user passwords, remote authentication servers, software upgrades), the provisioning of the encryption modules 114 and the control processor 112, and TLS 1.3 based communications to the encryption modules 114.

Figure 2:
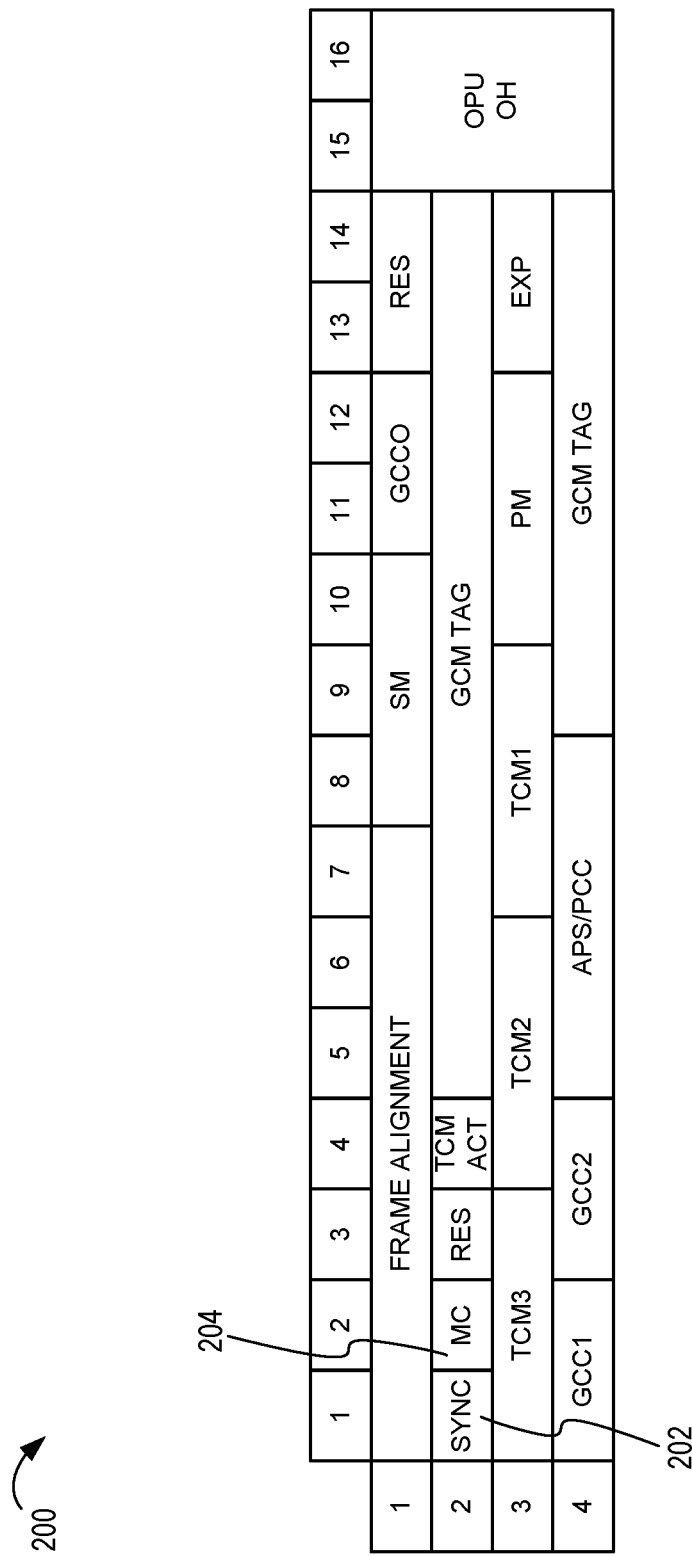
FIG. 2 illustrates the overhead byte used in the trusted channel.

FIG. 2 illustrates the overhead byte used in the trusted channel. One technique for reducing the complexity of SAE ID exchange is to perform an automatic SAE ID exchange between the encryption modems 116 using a trusted channel. In one example approach, encryption modems 116 include an in-band TLS 1.3 channel using a re-purposed unused optical transport network (OTN) overhead byte for management of the data path encryption feature. This TLS channel is authenticated using a Pre-Shared Key (PSK) or certificate and is initialized before the QKD functionality is instantiated. The messaging protocol running over this channel includes the new field to carry the SAE ID.

In one example approach, the network devices 110 implement two types of channels over link 175 using unused overhead bytes from the Optical Channel Data Unit (ODU) 200. In the example approach shown in FIG. 2, one or more bytes of the ODU 200 are used for management and coordination between a pair of local encryption modems 116. In one example approach, SYNC 202 provides in-band signaling for the data path ciphers (such as error detection, counter synchronization, and hitless bank switching, among other examples). Another byte, MC 204, can provide an Internet protocol (IP) based channel to enable communication between the components of the local and remote network devices.

In one such example approach, each local encryption modem 116 connects to its peer encryption modem 116 via the fiber optic cable of link 175. The fiber optic cable carries the payload as well as the side channels for management and key exchange. The MC 204 can be a trusted management channel. The management channel supports an IP channel (such as IPv6); in one example approach, a TLS 1.3 connection runs on top of the IP channel. This connection is used, for example, for the key agreement protocol.

Figure 3:
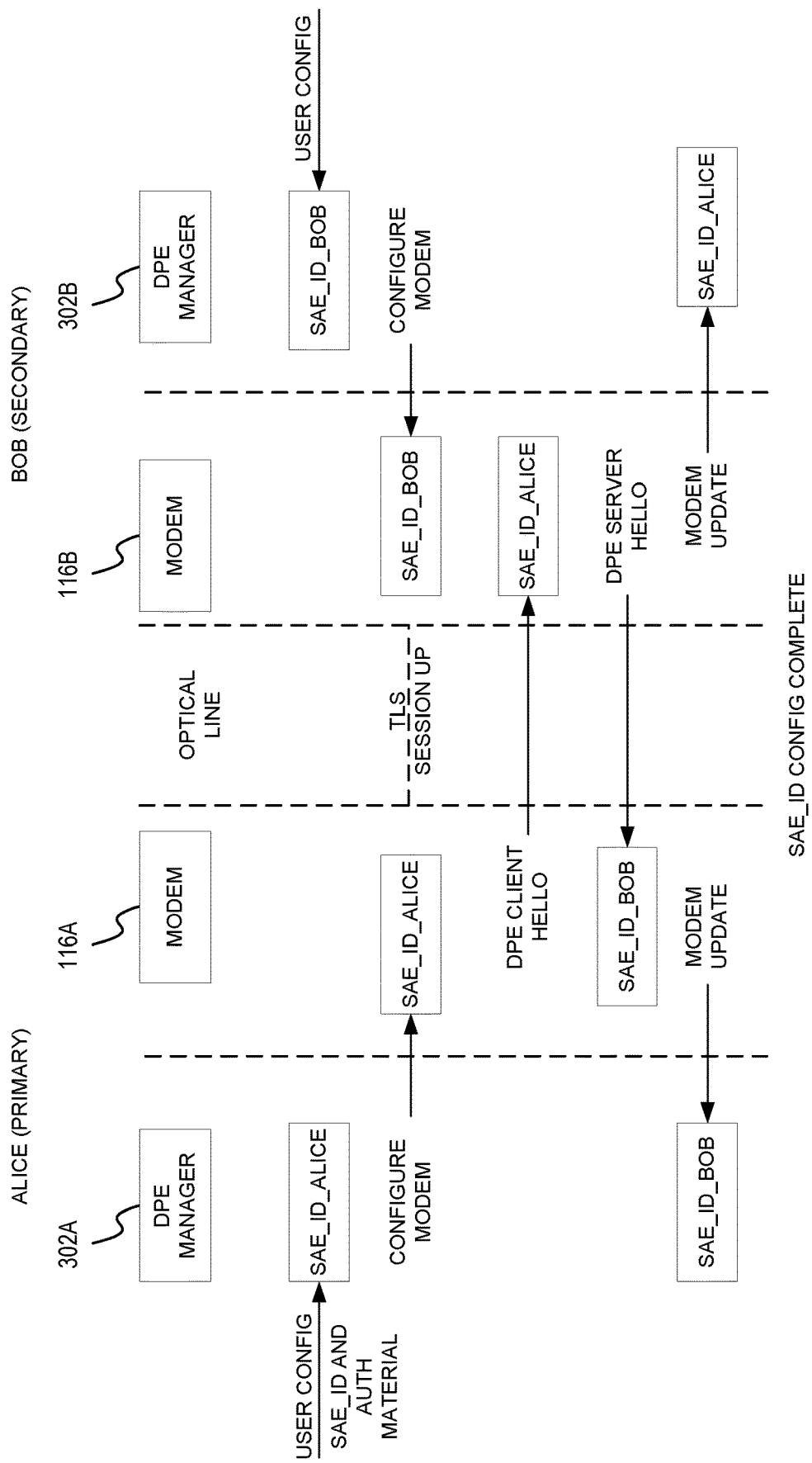
FIG. 3 illustrates provisioning of SAE IDs in the transport network of FIG. 1B.

FIG. 3 illustrates provisioning of SAE IDs in the system of FIG. 1B. As noted above, one technique for reducing the complexity of SAE ID exchange is to perform an automatic SAE ID exchange between the modems using a trusted communication channel such as described in the discussion of FIG. 2. One such SAE ID exchange will be discussed next.

In the example shown in FIG. 3, a Data Path Encryption (DPE) manager executing in control processor 112 receives an SAE ID. In the example shown in FIG. 3, a user configures the DPE manager 302A of a first network device (such as network device 110A) with an SAE ID (SAE ID="SAE ID_ALICE") and a user configures the DPE manager 302B of a second network device (such as network device 110B) with an SAE ID (SAE ID="SAE ID_BOB"). SAE ID exchange proceeds as follows.

The user configures the datapath encryption authentication material (PSK or Certificate) on all the SAEs (for example, network devices 110). The DPE Manager 302 running as software on the control processor 112 configures each encryption modem (for example, encryption modems 116 and 118) in the network device 110 with the authentication material and the SAE ID by each network device 110.

In one example approach, the encryption modem 116A of network device 110A establishes the TLS 1.3 session with its peer (such as the encryption modem 116B of the second network device 110B), using the provided authentication material. The encryption modem 116A of network device 110A then sends a "DPE client hello message" to the peer encryption modem 116 (for example, peer encryption modem 116B of the second network device 110B). This message contains the SAE ID of the client (i.e., the SAE ID of network device 110A).

The peer encryption modem 116B replies with a "DPE server hello" message. This message contains the SAE ID of the server peer modem (for example, network device 110B). Upon receiving the client or server hello message, the encryption modem 116 sends the received peer SAE ID to the control processor 112 via an update message. Once control processor 112 knows the SAE ID of the second network device 110B, control processor 112 can request the QKD cryptographic key based on the received SAE ID.

Figure 4:
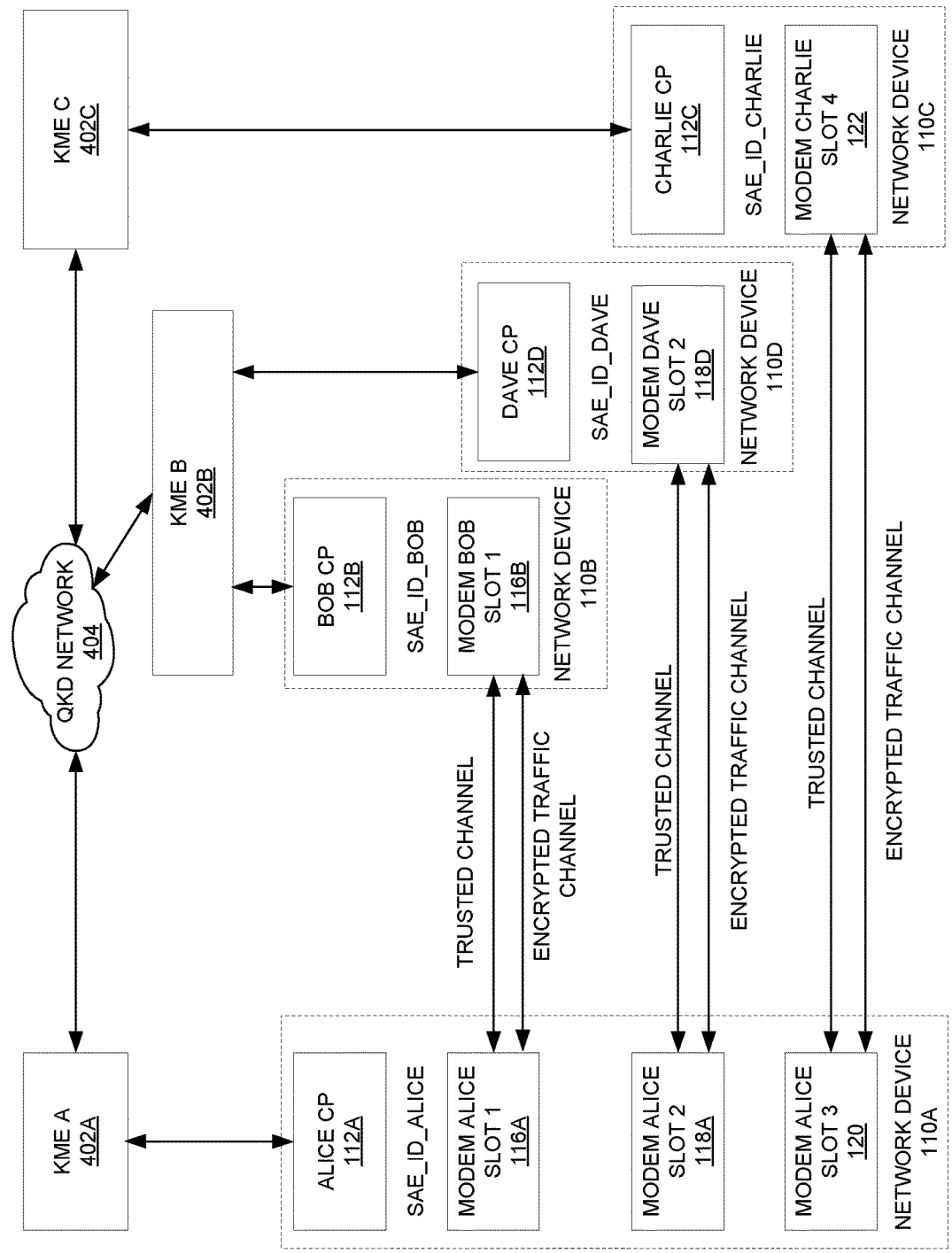
FIG. 4 illustrates a block diagram of a transport network having multiple network devices.

FIG. 4 is a block diagram of a QKD network having multiple network devices. In the example shown in FIG. 4, four network devices (network devices 110A, 110B, 110C, and 110D) are connected via Key Management Entities (KMEs) 402 to a QKD network 404. FIG. 4 shows a QKD network 404 having Key Management Entities (KMEs) A, B and C. Network device 110A ("Alice") has an encryption modem 116A (in slot 1), an encryption modem 118A (in slot 2), and encryption modem 120 (in slot 3), all terminating on different network devices 110. The user of network device 110A first needs to configure the SAE ID on all four network devices 110 and then establish a trusted channel 170 via link 175 to each of the other network devices (110B, 110C and 110D). The network 110A receives the SAE ID of the remote network devices 110B, 110C and 110D via their respective trusted channels and requests a QKD cryptographic key from KME A for encrypted traffic with remote network device 110B, 110C and 110D based on the received SAE IDs. Encryption modem 116A of network device 110A encrypts the data with the QKD cryptographic key for SAE ID_BOB and transfers the encrypted data to the respective encryption modem 116B of network device 110B via an encrypted traffic channel, as shown in FIG. 4. Similarly, modem 118A of network device 110A encrypts the data with the QKD cryptographic key for SAE ID_DAVE and transfers the encrypted data to the respective modem 118D of network device 110D via an encrypted traffic channel, while modem 120 of network device 110A encrypts the data with the QKD cryptographic key for SAE ID_CHARLIE and transfers the encrypted data to the respective modem 122 of network device 110C via an encrypted traffic channel, as shown in FIG. 4.

Figure 5:
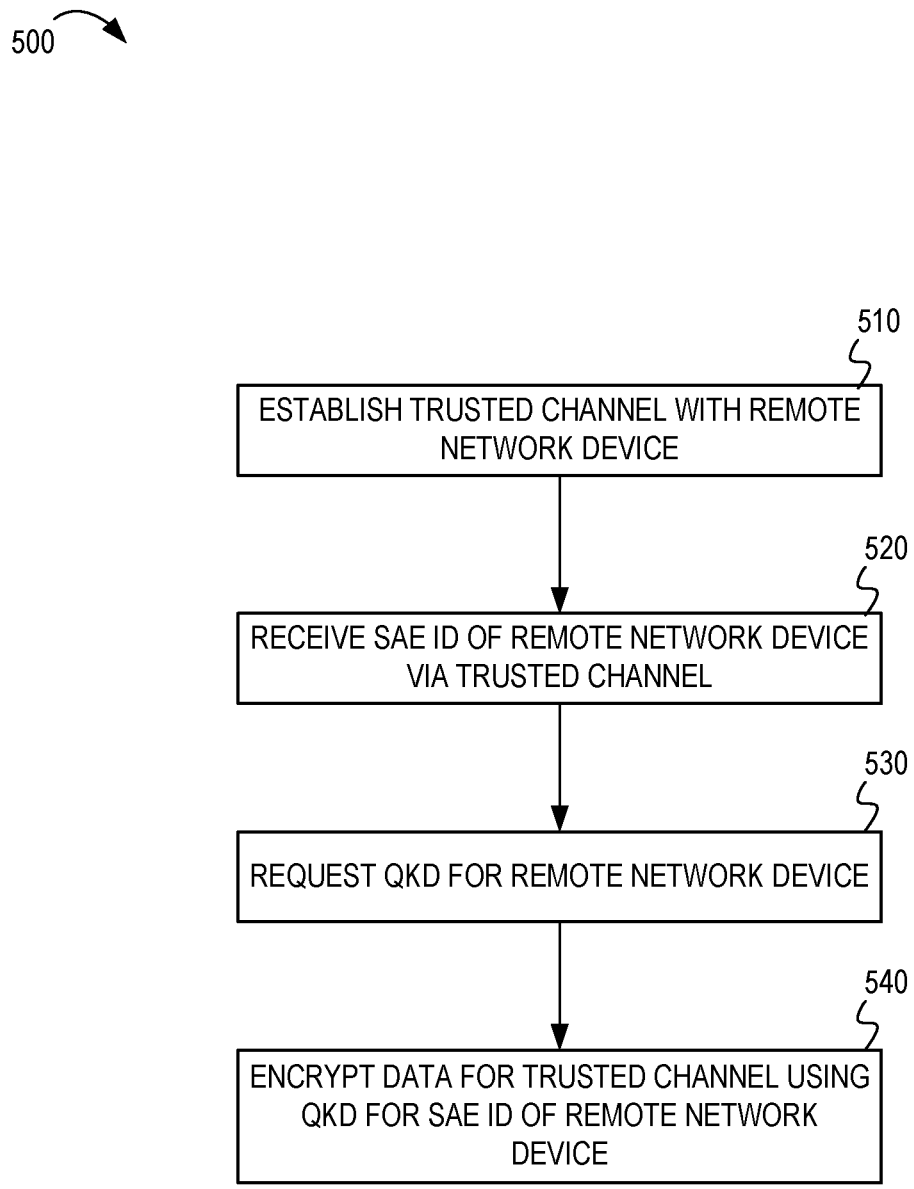
FIG. 5 illustrates a flow chart illustrating QKD encryption in a network device.

FIG. 5 is a flow chart illustrating QKD encryption in a network device connected to a QKD network. In the example approach shown in FIG. 5, a network device 110A establishes (510) a trusted channel with a remote network device 110B over a link 175. The network 110A receives (520) the SAE ID of the remote network device 110B via the trusted channel and requests (530) a QKD cryptographic key for encrypted traffic with remote network device 110B based on the received SAE ID. Encryption modem 116 of network device 110A encrypts (540) the data with the QKD cryptographic key and transfers the encrypted data to the encryption modem 116 of network device 110B.

Figure 6:
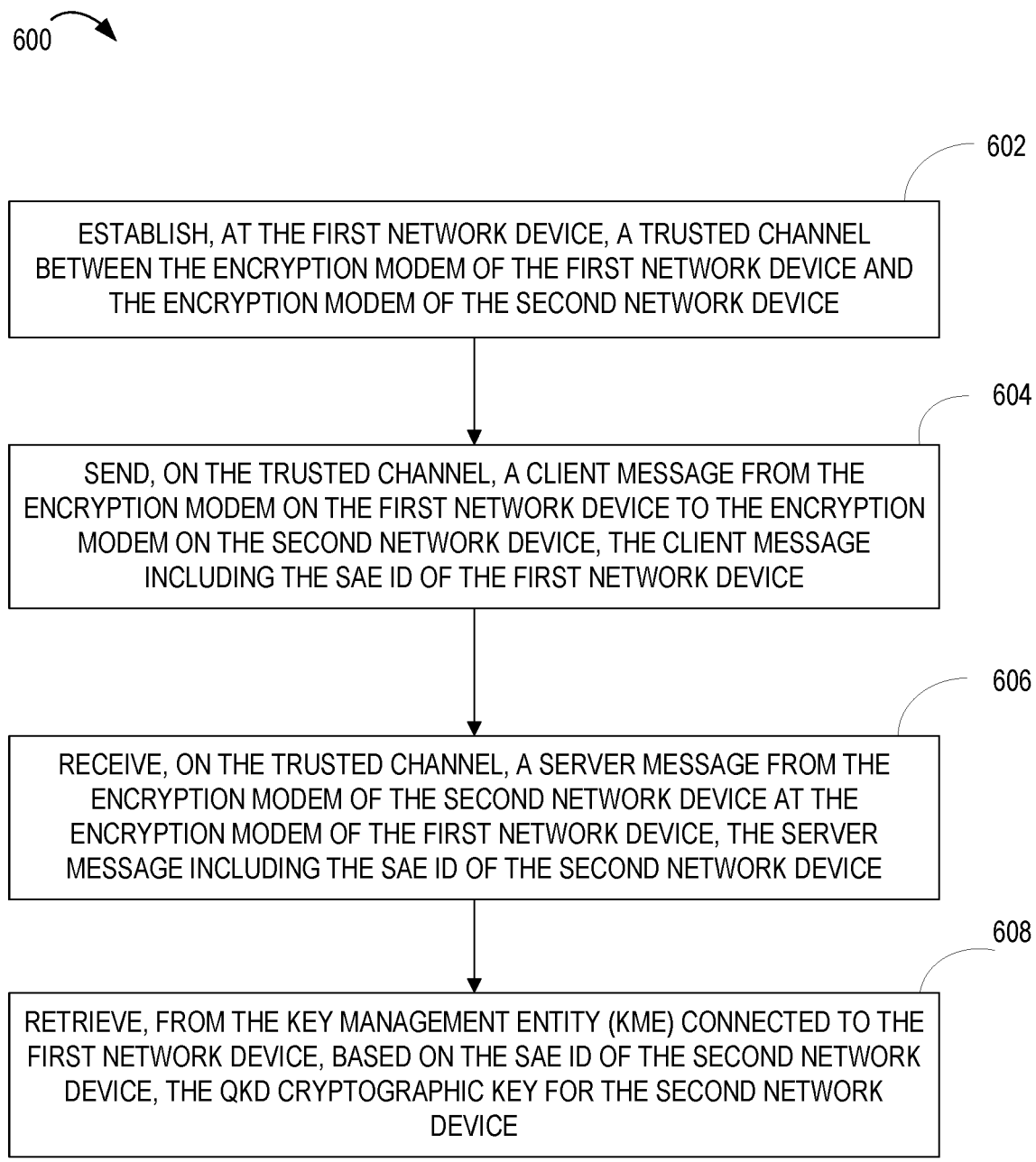
FIG. 6 illustrates a flow chart with example operations for retrieving QKD keys.

FIG. 6 illustrates a flow chart with example operations 600 for retrieving QKD cryptographic keys. In the example shown in FIG. 6, a system includes a plurality of network devices, including a first and a second network device, each network device including an encryption modem and having a Secure Application Entity Identifier (SAE ID), each network device connected to a Key Management Entity (KME), the KMEs linked in a QKD network. The operations 600 might be performed by any of the network devices 110 via encryption modems 116 configured by control processors 112, as described, for example, with reference to FIGS. 1B, 3 and 4.

In one example approach, as shown in block 602, the control processor 112 establishes, at the first network device 110A, a trusted channel via link 175 between the encryption modem 116 of the first network device 110A and the encryption modem 116 of the remote network device 110B. In block 604, the control processor 112 sends a client message (such as a "client hello message" in FIG. 3) from the encryption modem 116 on the first network device 110A via the trusted channel to the encryption modem 116 on the remote network device 110B, the client message including the SAE ID of the first network device 110A. In block 606, the first network device 110A receives a server message (such as the server hello message in FIG. 3) on the trusted channel from the encryption modem 116 on the second network device 110B at the first encryption modem 116 on the first network device 110A, the server hello message including the SAE ID of the second network device 110B. In block 608, the control processor 112 for the first network device 110 retrieves, from a Key Management Entity (KME) connected to the first network device, the QKD cryptographic key for the second network device, the QKD cryptographic key based on the SAE ID of the second network device.

In one example approach, the encryption modem 116 associated with the first SAE ID includes datapath encryption authentication material and, when establishing a trusted channel, the encryption modem 116 associated with the first SAE ID establishes a Transport Layer Security (TLS) session with the second network device using the datapath encryption authentication material. This approach allows each network device in the QKD encryption network to leverage an existing management channel to support the secure transfer of SAE IDs between network devices 110.

Figure 7:
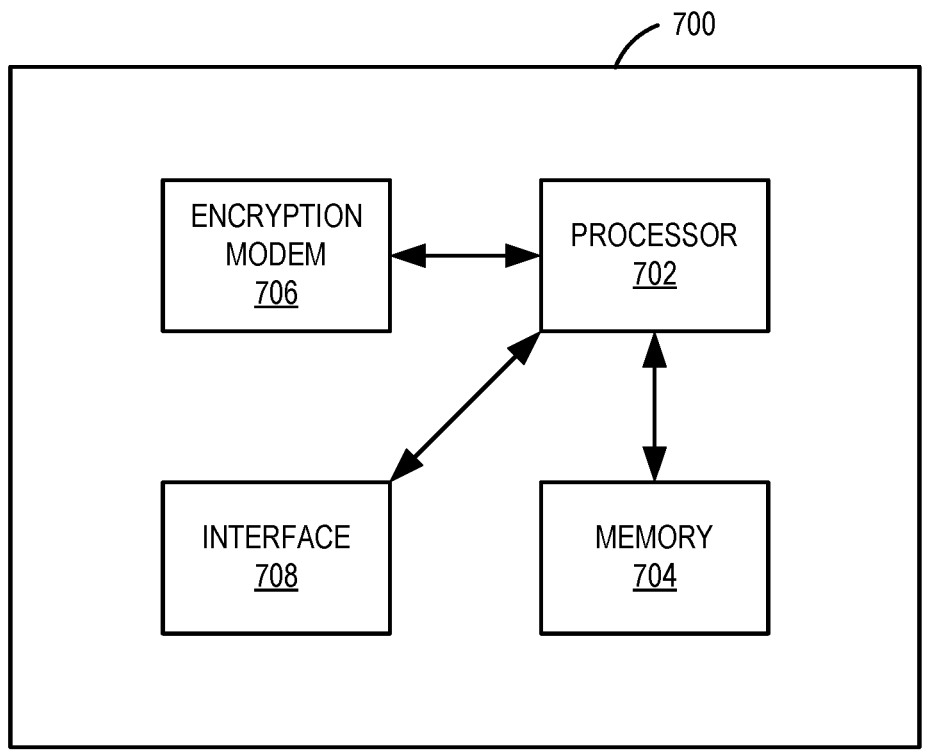
FIG. 7 illustrates a block diagram of an example apparatus.

FIG. 7 illustrates a block diagram of an example apparatus for QKD of cryptographic keys in a system having two or more network devices. In some implementations, the apparatus 700 may be a network device, such as any of the network devices 110 described with reference to FIGS. 1B, 3, and 4. The apparatus 700 may include a processor 702, a memory 704, an encryption modem 706, and an interface 708. The processor 702 may include multiple processors, multiple cores or multiple nodes. The processor 702 may implement multi-tasking and multi-threading, among other examples. The memory 704 may be system memory or any one or more of the possible realizations of computer-readable media described herein. In the example shown in FIG. 7, the processor 702 is connected to memory 704.

In the apparatus 700 of FIG. 7, encryption modem 706 may be the encryption modems 116 and 118 shown in FIG. 1B and the encryption modems 116 shown in FIGS. 3 and 4). In the example shown in FIG. 7, the processor 702 is a control processor 112 (as shown in FIG. 1B) connected to a modem 706. The interface 708 may be an interface such as the interface to network nodes 142 or 144, as shown in FIG. 1B, or the interface to KME 102, as shown in FIG. 1A.

In some implementations, modem 706 and interface 708 may be distributed within the processor 702 and the memory 704. The memory 704 may include computer instructions executable by the processor 702 to implement the functionality of the implementations described herein. Any one of these functionalities may be partially, or entirely, implemented in hardware or on the processor 702. For example, the functionality may be implemented with an application specific integrated circuit, in logic implemented in the processor 702, in a co-processor on a peripheral device or card, among other examples. Further, realizations may include fewer or additional components not illustrated in FIG. 7. In one example approach, the processor 702, the memory 704, and the modem 706 may be coupled to a bus (not shown).

FIG. 1A through FIG. 7 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in consideration of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (identified as clauses for reference).

CLAUSES

Clause 1. A first network device, including: a first encryption modem configured to: establish a trusted channel with a second encryption modem of a second network device, send a client message to the second encryption modem via the trusted channel, the client message indicating a first secure application entity identifier (SAE ID) associated with the first network device, and receive a server message from the second encryption modem via the trusted channel, the server message indicating a second SAE ID associated with the second network device; and a control processor (CP) communicatively coupled to the first encryption modem, the CP configured to request Quantum Key Distribution (QKD)

cryptographic key for use with the second network device from a Key Management Entity (KME) based on the second SAE ID.

Clause 2. The first network device of clause 1, where the first encryption modem is configured to establish the trusted channel as a Transport Layer Security (TLS) session with the second network device using datapath encryption authentication material.

Clause 3. The first network device of clause 2, where the datapath encryption authentication material includes one or more of a certificate, credentials, a key agreement, a key exchange, or a pre-shared key (PSK).

Clause 4. The first network device of clause 1, where the CP is configured to receive the second SAE ID from the first encryption modem.

Clause 5. The first network device of clause 4, where the CP is configured to receive the QKD cryptographic key from the KME, and provide the QKD cryptographic key to the first encryption modem, and where the first encryption modem is configured to encrypt an encrypted traffic channel between the first network device and second network device using the QKD cryptographic key.

Clause 6. The first network device of clause 1, where the trusted channel is a Transport Layer Security (TLS) channel.

Clause 7. The first network device of clause 6, where the trusted channel is a byte of the optical transport network (OTN) frame.

Clause 8. The first network device of clause 1, where the trusted channel is an out-of-band authenticated channel.

Clause 9. The first network device of clause 1, where the trusted channel is an authenticated channel or a secure physical connection.

Clause 10. The first network device of clause 1, where the first network device further includes: a third encryption modem configured to: establish a second trusted channel with a fourth encryption modem of a third network device, send a second client message to the fourth encryption modem via the second trusted channel, the second client message indicating the first SAE ID, and receive a second server message from the fourth encryption modem via the trusted channel, the second server message indicating a third SAE ID associated with the third network device; and where the control processor (CP) is communicatively coupled to the third encryption modem, the CP configured to request a second QKD cryptographic key for use with the third network device from the KME based on the third SAE ID.

Clause 11. The first network device of clause 10, where the first network device further includes: a fifth encryption modem configured to: establish a third trusted channel with a sixth encryption modem of a fourth network device, send a third client message to the sixth encryption modem via the third trusted channel, the third client message indicating the first SAE ID, and receive a third server message from the sixth encryption modem via the trusted channel, the third server message indicating a fourth SAE ID associated with the fourth network device; and where the control processor (CP) is communicatively coupled to the fifth encryption modem, the CP configured to request a third QKD cryptographic key for use with the fourth network device from the KME based on the fourth SAE ID.

Clause 12. A method of retrieving Quantum Key Distribution (QKD) cryptographic keys at a first network device in a system having a plurality of network devices, including a second network device, each network device in the system including a first encryption modem and having a Secure Application Entity Identifier (SAE ID), each network device connected to a Key Management Entity (KME), the KMEs linked in a QKD network, the method including: establishing, at the first network device, a first trusted channel between the first encryption modem of the first network device and the first encryption modem of the second network device; sending, on the first trusted channel, a client message from the first encryption modem of the first network device to the first encryption modem of the second network device, the client message including the SAE ID of the first network device; receiving, via the first trusted channel, a server hello message from the first encryption modem of the second network device at the first encryption modem of the first network device, the server hello message including the SAE ID of the second network device; and retrieving, from the KME connected to the first network device, based on the SAE ID of the second network device, the QKD cryptographic key for use with the second network device.

Clause 13. The method of clause 12, where establishing a first trusted channel includes: configuring the encryption modem of the first network device with datapath encryption authentication material; and establishing, at the first network device, a Transport Layer Security (TLS) session with the second network device using the datapath encryption authentication material.

Clause 14. The method of clause 13, where the datapath encryption authentication material for the encryption modem on the first network device includes one or more of a certificate, a key agreement, a key exchange, or a pre-shared key (PSK).

Clause 15. The method of clause 12, where the first network device further includes a second encryption modem and where the plurality of network devices further include a third network device, the third network device including an SAE ID and a first encryption modem, the method further including: establishing, at the first network device, a second trusted channel between the second encryption modem of the first network device and the first encryption modem of the third network device; sending, on the second trusted channel, a client message from the second encryption modem of the first network device to the first encryption modem of the third network device, the client message including the SAE ID of the first network device; receiving, via the second trusted channel, a server hello message from the first encryption modem of the third network device at the second encryption modem of the first network device, the server hello message including the SAE ID of the third network device; and retrieving, from the KME connected to the first network device, based on the SAE ID of the third network device, a QKD cryptographic key for use with the third network device.

Clause 16. A first network device, including: a control processor (CP); and a first encryption modem communicatively coupled to the CP, the first encryption modem configured to: establish a first trusted channel between the first encryption modem of the first network device and the first encryption modem of a second network device; receive a client message from the first encryption modem of the second network device via the first trusted channel, the client message indicating a second secure application entity identifier (SAE ID) associated with the second network device; forward the second SAE ID to the CP; send a server message to the first encryption modem of the second network device via the first trusted channel, the server message indicating a first SAE ID associated with the first network device; and receive data from the first encryption modem of the second network device, the data encrypted with a Quantum Key Distribution (QKD) cryptographic key for use with the first network device, the QKD cryptographic key associated with the first SAE ID.

Clause 17. The first network device of clause 16, where the first encryption modem of the first network device is further configured to: configure the first encryption modem of the first network device with datapath encryption authentication material; and establish, at the first encryption modem of the first network device, a Transport Layer Security (TLS) session with the first encryption modem of the second network device using the datapath encryption authentication material.

Clause 18. The first network device of clause 17, where the datapath encryption authentication material for the encryption modem on the first network device includes one or more of a certificate, a key agreement, a key exchange, or a pre-shared key (PSK).

Clause 19. The first network device of clause 16, where the first network device further includes a second encryption modem, the second encryption modem of the first network device and the first encryption modem of the third network device, the second encryption modem of the first network device configured to: establish, on the second link, a second trusted channel, the second trusted channel between the second encryption modem of the first network device and the first encryption modem of the third network device, send a client message to the first encryption modem of the third network device on the second trusted channel, the client message including the SAE ID of the first network device; receive a server message from the first encryption modem of the third remote network device on the second trusted channel, the server message including the SAE ID of the third network device; forward the SAE ID of the second network device to the CP of the first network device; and retrieve, from a first Key Management Entity (KME), the QKD cryptographic key for the third network device, the QKD cryptographic key for the third network device based on the SAE ID of the third network device.

Clause 20. The system of clause 19, where the first encryption modem of the first network device and the second encryption modem of the first network device are configured to connect via a first and a second link to the first encryption modem of the second network device and the first encryption modem of the third network device, respectively, where each link forms part of an optical transport network (OTN), where the first trusted channel and where the second trusted channel are management channels of the first link and the second link, respectively.

Another innovative aspect of the subject matter described in this disclosure can be implemented as a computer-readable medium having stored therein instructions which, when executed by a processor, causes the processor to perform any one of the above-mentioned functionalities.

Another innovative aspect of the subject matter described in this disclosure can be implemented as a system having means for implementing any one of the above-mentioned functionalities.

Another innovative aspect of the subject matter described in this disclosure can be implemented as an apparatus having one or more processors configured to perform one or more operations from any one of the above-mentioned methods.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM, or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A first network device, comprising:
a first encryption modem configured as a physical-layer device providing encryption and decryption of data communicated over a channel the first encryption modem configured to:
    establish a trusted channel with a second encryption modem of a second network device,
    send a client message to the second encryption modem via the trusted channel, the client message indicating a first secure application entity identifier (SAE ID) associated with the first network device, and
    receive a server message from the second encryption modem via the trusted channel, the server message indicating a second SAE ID associated with the second network device; and
a control processor (CP) communicatively coupled to the first encryption modem, wherein the CP is configured to directly interface with an externally located Key Management Entity (KME) using the second SAE ID, the CP retrieving autonomously, based solely on the exchanged SAE IDs via the trusted channel, a Quantum Key Distribution (QKD) cryptographic key from the externally located KME for encrypting communication between the first and second network devices, wherein the autonomous retrieval of the QKD cryptographic key is performed without requiring centralized key management coordination.

2. The first network device of claim 1,
wherein the first encryption modem is configured to establish the trusted channel as a Transport Layer Security (TLS) session with the second network device using datapath encryption authentication material, the datapath encryption authentication material autonomously provisioned locally by the CP.

3. The first network device of claim 2, wherein the datapath encryption authentication material includes one or more of a certificate, credentials, a key agreement, a key exchange, or a pre-shared key (PSK).

4. The first network device of claim 1, wherein the CP is configured to receive the second SAE ID from the first encryption modem.

5. The first network device of claim 4,
wherein the CP is configured to receive the QKD cryptographic key from the KME, and provide the QKD cryptographic key to the first encryption modem, and
wherein the first encryption modem is configured to encrypt an encrypted traffic channel between the first network device and second network device using the QKD cryptographic key.

6. The first network device of claim 1,
wherein the trusted channel is a Transport Layer Security (TLS) channel.

7. The first network device of claim 6, wherein the trusted channel is a byte of an optical transport network (OTN) frame.

8. The first network device of claim 1, wherein the trusted channel is an out-of-band authenticated channel.

9. The first network device of claim 1, wherein the trusted channel is an authenticated channel or a secure physical connection.

10. The first network device of claim 1, wherein the first network device further comprises:
a third encryption modem configured to:
    establish a second trusted channel with a fourth encryption modem of a third network device,
    send a second client message to the fourth encryption modem via the second trusted channel, the second client message indicating the SAE ID of the first network device, and
    receive a second server message from the fourth encryption modem via the trusted channel, the second server message indicating an SAE ID associated with the third network device; and
wherein the control processor (CP) is communicatively coupled to the third encryption modem, the CP further configured to autonomously directly with the externally located KME using the SAE ID associated with the third network device to retrieve a second QKD cryptographic key for encrypting communications between the first and third network devices, based solely on SAE IDs exchanged via the second trusted channel.

11. The first network device of claim 10, wherein the first network device further comprises:
a fifth encryption modem configured to:
    establish a third trusted channel with a sixth encryption modem of a fourth network device,
    send a third client message to the sixth encryption modem via the third trusted channel, the third client message indicating the SAE ID of the first network device, and
    receive a third server message from the sixth encryption modem via the trusted channel, the third server message indicating an SAE ID associated with the fourth network device; and
wherein the control processor (CP) is communicatively coupled to the fifth encryption modem, the CP further configured to autonomously interface directly with the externally located KME to retrieve a third QKD cryptographic key for encrypting communications between the first and fourth network devices, based solely on SAE IDs exchanged via the third trusted channel.

12. A method of retrieving Quantum Key Distribution (QKD) cryptographic keys at a first network device in a system having a plurality of network devices, including a second network device, each network device in the system including a first encryption modem configured as a physical-layer device providing encryption of decryption of data communicated over a data channel and having a Secure Application Entity Identifier (SAE ID), each network device connected to a Key Management Entity (KME), the KMEs linked in a QKD network, the method comprising:

establishing, at the first network device, a first trusted channel between the first encryption modem of the first network device and the first encryption modem of the second network device;

sending, on the first trusted channel, a client message from the first encryption modem of the first network device to the first encryption modem of the second network device, the client message including the SAE ID of the first network device;

receiving, via the first trusted channel, a server hello message from the first encryption modem of the second network device at the first encryption modem of the first network device, the server hello message including the SAE ID of the second network device; and autonomously interface directly with an externally located KME by the first network device, based solely on the SAE ID exchanged via the first trusted channel, to retrieve e QKD cryptographic key for use with the second network device, wherein the autonomous retrieval of the QKD cryptographic key is performed without requiring centralized key management coordination.

13. The method of claim 12, wherein establishing a first trusted channel includes:

configuring the first encryption modem of the first network device with datapath encryption authentication material; and establishing, at the first network device, a Transport Layer Security (TLS) session with the second network device using the datapath encryption authentication material, wherein the datapath encryption authentication material is autonomously provisioned locally at the first network device.

14. The method of claim 13, wherein the datapath encryption authentication material for the first encryption modem on the first network device includes one or more of a certificate, a key agreement, a key exchange, or a pre-shared key (PSK).

15. The method of claim 12, wherein the first network device further includes a second encryption modem and wherein the plurality of network devices further include a third network device, the third network device including an SAE ID and a first encryption modem, the method further comprising:

establishing, at the first network device, a second trusted channel between the second encryption modem of the first network device and the first encryption modem of the third network device;

sending, on the second trusted channel, a client message from the second encryption modem of the first network device to the first encryption modem of the third network device, the client message including the SAE ID of the first network device;

receiving, via the second trusted channel, a server hello message from the first encryption modem of the third network device at the second encryption modem of the first network device, the server hello message including the SAE ID of the third network device; and autonomously interfacing directly with the externally located KME by the first network device, based solely on the SAE ID exchanged via the second trusted channel, to retrieve a second QKD cryptographic key for use with the third network device.

16. A first network device, comprising:

a control processor (CP); and a first encryption modem communicatively coupled to the CP and configured as a physical-layer device providing encryption and decryption of data communicated over a data channel, the first encryption modem configured to:

establish a first trusted channel between the first encryption modem of the first network device and the first encryption modem of a second network device;

receive a client message from the first encryption modem of the second network device via the first trusted channel, the client message indicating a second secure application entity identifier (SAE ID) associated with the second network device;

forward the second SAE ID to the CP;

send a server message to the first encryption modem of the second network device via the first trusted channel, the server message indicating a first SAE ID associated with the first network device; and receive data from the first encryption modem of the second network device, the data encrypted with a Quantum Key Distribution (QKD) cryptographic key for use with the first network device, the QKD cryptographic key associated with the first SAE ID, the QKD cryptographic key retrieved by the CP autonomously and directly from a Texter ally located KME be ad solely on the second SAE ID.

17. The first network device of claim 16, wherein the first encryption modem of the first network device is further configured to:

configure the first encryption modem of the first network device with datapath encryption authentication material; and establish, at the first encryption modem of the first network device, a Transport Layer Security (TLS) session with the first encryption modem of the second network device using the datapath encryption authentication material, wherein the datapath encryption authentication material is autonomously provisioned locally at the first network device.

18. The first network device of claim 17, wherein the datapath encryption authentication material for the first encryption modem on the first network device includes one or more of a certificate, a key agreement, a key exchange, or a pre-shared key (PSK).

19. The first network device of claim 16, wherein the first network device further includes a second encryption modem, the second encryption modem of the first network device configured to:

send a client message to the first encryption modem of a third network device on a second trusted channel, the client message including the SAE ID of the first network device;

receive a server message from the first encryption modem of the third network device on the second trusted channel, the server message including the SAE ID of the third network device;

forward the SAE ID of the second network device to the CP of the first network device; and autonomously interface directly with an externally located first KME to retrieve a QKD cryptographic key for use with the third network device, based solely on the SAE ID exchanged via the second trusted channel.

20. The first network device of claim 19, wherein the first encryption modem of the first network device and the second encryption modem of the first network device are configured to connect via a first and a second link to the first encryption modem of the second network device and the first encryption modem of the third network device, respectively, wherein each link forms part of an optical transport network (OTN), and wherein the first trusted channel and the second trusted channel are management channels of the first link and the second link, respectively.

* * * * *